(12) United States Patent
Gaikwad et al.

(10) Patent No.: US 10,749,933 B2
(45) Date of Patent: *Aug. 18, 2020

(54) DATA SHARING AMONG PROCESSING SYSTEMS IN A COLLABORATION GROUP

(71) Applicant: INTERNATIONAL BUSINESS MACHINES CORPORATION, Armonk, NY (US)

(72) Inventors: Bhavana Ramakant Gaikwad, Hadapsar (IN); Girish Padmanabhan, Pune (IN); Rajesh V. Patil, Pune (IN); Prasad P. Purandare, Dhankawdi (IN); Hina Purohit, Pimple Saudagar (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/407,253

(22) Filed: May 9, 2019

(65) Prior Publication Data
US 2019/0268400 A1    Aug. 29, 2019

Related U.S. Application Data

(63) Continuation of application No. 15/806,373, filed on Nov. 8, 2017.

(51) Int. Cl.
*H04L 29/08* (2006.01)
*H04W 4/08* (2009.01)
(Continued)

(52) U.S. Cl.
CPC .......... *H04L 67/06* (2013.01); *H04L 12/1822* (2013.01); *H04L 51/04* (2013.01);
(Continued)

(58) Field of Classification Search
None
See application file for complete search history.

(56) References Cited

U.S. PATENT DOCUMENTS

2014/0129652 A1    5/2014    Chan et al.
2014/0274031 A1    9/2014    Menendez
(Continued)

OTHER PUBLICATIONS

List of IBM Patents or Patent Applications Treated as Related; Date Filed: Sep. 25, 2019, 2 pages.
(Continued)

*Primary Examiner* — Cai Y Chen
(74) *Attorney, Agent, or Firm* — Cantor Colburn LLP; Richard Wilhelm (57) ABSTRACT

Examples of techniques for data sharing among processing systems in a collaboration group are disclosed. In one example implementation according to aspects of the present disclosure, a computer-implemented method includes receiving a message sent to a collaboration group via a first network connection. The first processing system is a member of the collaboration group. The method further includes downloading data associated with the message via the first network connection. The method further includes determining whether any additional processing systems that are members of the collaboration group are in proximity to the first processing system. The method further includes, based at least in part on determining that a second processing system that is a member of the collaboration group is in proximity to the first processing system, transmitting a message indicator from the first processing system to the second processing system via a second network connection.

6 Claims, 5 Drawing Sheets

(51) Int. Cl.
  *H04L 12/58* (2006.01)
  *H04W 4/80* (2018.01)
  *H04L 12/18* (2006.01)
  *H04W 4/02* (2018.01)

(52) U.S. Cl.
  CPC .......... *H04L 51/08* (2013.01); *H04W 4/023* (2013.01); *H04W 4/08* (2013.01); *H04W 4/80* (2018.02); *H04L 67/141* (2013.01)

(56) References Cited

U.S. PATENT DOCUMENTS

2016/0183064 A1  6/2016  Wouhaybi
2017/0164163 A1* 6/2017  Lee ..................... H04W 4/08

OTHER PUBLICATIONS

Gaikwad et al., "Data Sharing Among Processing Systems in a Collaboration Group," U.S. Appl. No. 16/582,067, filed Sep. 26, 2019.
List of IBM Patents or Patent Applications Treated as Related; Date Filed: May 9, 2019, 2 pages.
Gaikwad et al., "Data Sharing Among Processing Systems in a Collaboration Group," U.S. Appl. No. 15/806,373, filed Nov. 8, 2017.

* cited by examiner

DATA SHARING AMONG PROCESSING SYSTEMS IN A COLLABORATION GROUP

DOMESTIC PRIORITY

This application is a continuation of U.S. patent application Ser. No. 15/806,373, filed Nov. 8, 2017, the disclosure of which is incorporated by reference herein in its entirety.

BACKGROUND

The present invention generally relates to data processing, and more specifically, to data sharing among processing systems in a collaboration group.

Computer processing systems (e.g., laptops, smartphones, wearable computing devices, desktop computers, etc.) enable users to exchange data and communicate over a network (e.g., the Internet, a local area network (LAN), etc.). In particular, computing systems can use messaging (e.g., instant messaging, text messaging, etc.) programs that enable users to exchange data and communicate directly with one another. Groups of friends, colleagues, co-workers, teammates, etc. can create "group chats" to enable data and messages to be shared among the users (e.g., using the users' computing systems) in the group. For example, a user of the group (i.e., a collaboration group) could send a message or data (e.g., an image file, an audio file, a video file, etc.) to the group. This enables messages and data to be shared with many users quickly and efficiently.

SUMMARY

Embodiments of the present invention are directed to computer-implemented methods, systems, and computer program products for data sharing among processing systems in a collaboration group. A non-limiting example of a computer-implemented method includes receiving, by a first processing system, a message sent to a collaboration group via a first network connection. The first processing system is a member of the collaboration group. The method further includes downloading, by the first processing system, data associated with the message via the first network connection. The method further includes determining, by the first processing system, whether any additional processing systems that are members of the collaboration group are in proximity to the first processing system. The method further includes, based at least in part on determining that a second processing system that is a member of the collaboration group is in proximity to the first processing system, transmitting, by the first processing system, a message indicator from the first processing system to the second processing system via a second network connection.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Figure 1:
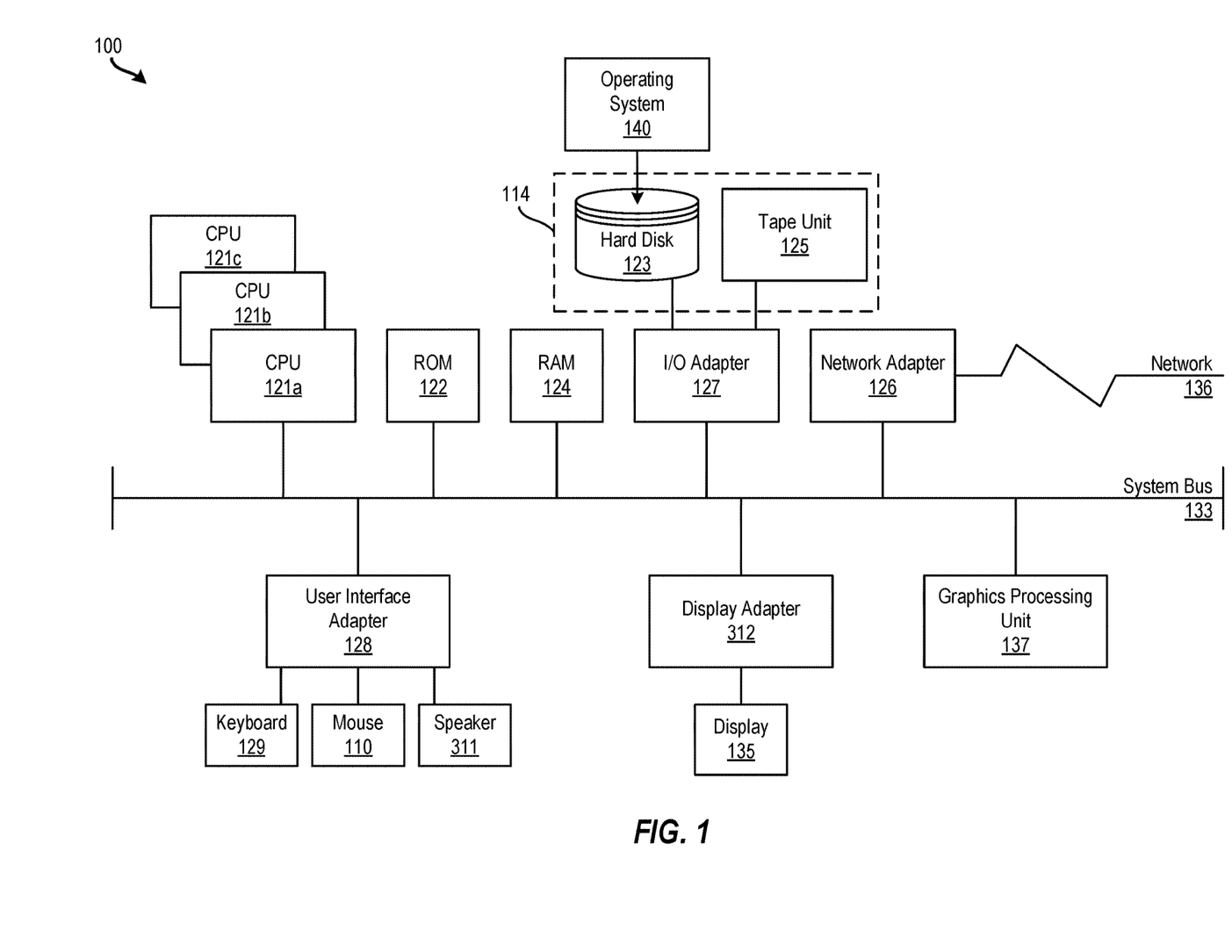
FIG. 1 depicts a processing system for implementing the techniques described herein, according to aspects of the present disclosure.

It is understood that embodiments of the present invention are capable of being implemented in conjunction with any other suitable type of computing environment now known or later developed. For example, FIG. 1 illustrates a block diagram of a processing system 100 for implementing the techniques described herein. In examples, processing system 100 has one or more central processing units (processors) 121a, 121b, 121c, etc. (collectively or generically referred to as processor(s) 121 and/or as processing device(s)). In aspects of the present disclosure, each processor 121 may include a reduced instruction set computer (RISC) microprocessor. Processors 121 are coupled to system memory (e.g., random access memory (RAM) 124) and various other components via a system bus 133. Read only memory (ROM) 122 is coupled to system bus 133 and may include a basic input/output system (BIOS), which controls certain basic functions of processing system 100.

Further illustrated are an input/output (I/O) adapter 127 and a communications adapter 126 coupled to system bus 133. I/O adapter 127 may be a small computer system interface (SCSI) adapter that communicates with a hard disk 123 and/or a tape storage drive 125 or any other similar component. I/O adapter 127, hard disk 123, and tape storage device 125 are collectively referred to herein as mass storage 134. Operating system 140 for execution on processing system 100 may be stored in mass storage 134. A network adapter 126 interconnects system bus 133 with an outside network 136 enabling processing system 100 to communicate with other such systems.

A display (e.g., a display monitor) 135 is connected to system bus 133 by display adaptor 132, which may include a graphics adapter to improve the performance of graphics intensive applications and a video controller. In one aspect of the present disclosure, adapters 126, 127, and/or 132 may be connected to one or more I/O busses that are connected to system bus 133 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 133 via user interface adapter 128 and display adapter 132. A keyboard 129, mouse 130, and speaker 131 may be interconnected to system bus 133 via user interface adapter 128, which may include, for example, a Super I/O chip integrating multiple device adapters into a single integrated circuit.

In some aspects of the present disclosure, processing system 100 includes a graphics processing unit 137. Graphics processing unit 137 is a specialized electronic circuit designed to manipulate and alter memory to accelerate the creation of images in a frame buffer intended for output to a display. In general, graphics processing unit 137 is very efficient at manipulating computer graphics and image processing, and has a highly parallel structure that makes it more effective than general-purpose CPUs for algorithms where processing of large blocks of data is done in parallel.

Thus, as configured herein, processing system 100 includes processing capability in the form of processors 121, storage capability including system memory (e.g., RAM 124), and mass storage 134, input means such as keyboard 129 and mouse 130, and output capability including speaker 131 and display 135. In some aspects of the present disclosure, a portion of system memory (e.g., RAM 124) and mass storage 134 collectively store an operating system such as the AIX® operating system from IBM Corporation to coordinate the functions of the various components shown in processing system 100.

Turning now to an overview of technologies that are more specifically relevant to aspects of the present disclosure, data sharing among devices in a collaboration group is now described. A collaboration group (or "group") can include users that share messages and data (e.g., text, an image file, an audio file, a video file, an animation, etc.) among one another via their respective processing systems.

Although collaboration groups enable messages and data to be shared with many users quickly and efficiently, collaboration groups also have disadvantages. For example, not all users in a collaboration group may want to receive data sent to the collaboration group. Current messaging programs, such as text messaging, often automatically download messages and images on a user's processing system that are sent to a collaboration group. This can cause the user's computing system to receive data that consumes resources of the processing system (e.g., network bandwidth for receiving the data, memory for storing the data, power to display the data on a display, etc.).

The present techniques address the above-described shortcomings of the prior art by providing for data sharing among processing system is in a collaboration group. For example, a first processing system receives a message sent to a collaboration group via a first network connection. The first processing system is a member of the collaboration group. The first processing system then downloads data (e.g., text, an image file, an audio file, a video file, an animation, etc.) associated with the message. The first processing system determines whether any additional processing systems that are members of the collaboration group are in proximity to the first processing system. If a second processing system that is a member of the collaboration group is in proximity to the first processing system, the first processing system transmits a message indicator from the first processing system to the second processing system via a second network connection. The message indicator can be a second message to the second processing system to alert the user of the second processing system that a message sent to the collaboration group is available, and the user can then download the message directly from the first processing system via the second network connection.

Figure 2:
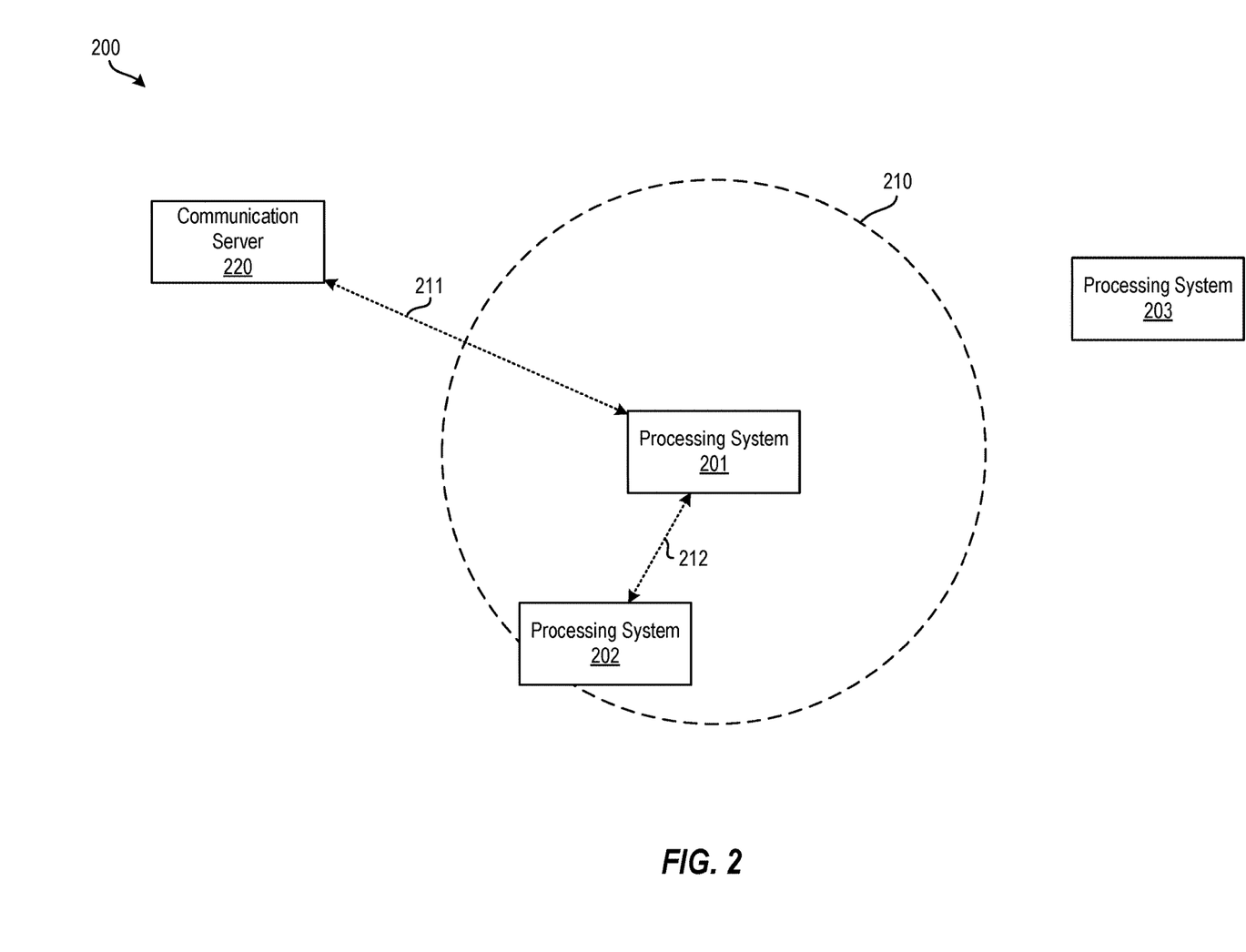
FIG. 2 depicts an environment for data sharing among processing systems in a collaboration group, according to aspects of the present disclosure.
Figure 3:
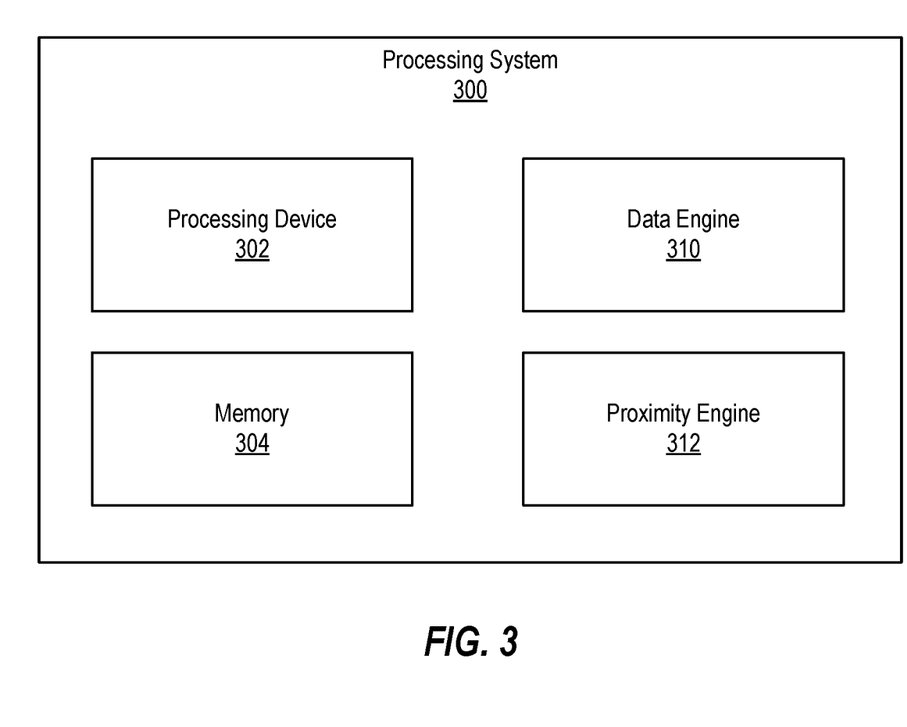
FIG. 3 depicts a processing system for data sharing among processing systems in a collaboration group, according to aspects of the present disclosure.

FIG. 2 depicts an environment for data sharing among processing systems 201, 202, 203 in a collaboration group, according to aspects of the present disclosure. Each of the processing systems 201-203 can be configured as depicted in FIG. 3, for example.

The collaboration group, in this example, includes the processing systems 201-203, although the collaboration group can include more or less processing systems than shown. When one of the processing systems (e.g., the processing system 203) in the collaboration group sends a message to the other processing systems (e.g., the processing systems 201, 202) in the collaboration group, the message is sent, for example, through a communication server 220. The communication server 220 can relay the message from the processing system 203 to the processing system 201. The communication server 220 can be any suitable processing system, such as the processing system 100, or another suitable processing system. It should be appreciated that the message and associated data can be sent from one processing system to another processing system directly in a point-to-point transfer.

As discussed above, it may be desirable to send the message and data from one processing system directly to another processing system. In the example of FIG. 2, the processing system 201 receives the message from the communication server 220 and downloads data associated with the message from the communication server 220. Receiving and downloading the message and associated data occurs via a network connection 211 between the communication server 220 and the processing system 201.

The network connection 211 can be any suitable network connection, such as a wired or wireless network. However, in the example of FIG. 2, the network connection 211 is a wireless network connection suitable for transmitting and receiving messages and data. Examples of suitable wireless network connections can include cellular networks (e.g., cellular data services such as global system for mobile communications (GSM), code-division multiple access (CDMA), general packet radio service (GPRS), broadband cellular networking (e.g., 3G, 4G, etc.) and similar), Wi-Fi network connections, wide-area network connections, mobile satellite network connections, and other suitable types of wireless network connections.

Once the processing system 201 receives the message and downloads the data, the processing system 201 determines whether any additional processing systems (that are members of the collaboration group) are in proximity 210 to the processing system 201. In the example of FIG. 2, the processing system 202 is in proximity 210 to the processing system 201. Accordingly, the processing system 201 transmits a message indicator to the processing system 202 over the network connection 212. The message indicator can be an indication that a message and data were sent to the collaboration group, a hyperlink to download the message and/or data, a hyperlink to initiate a screen sharing session from the processing 201 on the processing system 202 (i.e., enabling the processing system 201 to share its screen with the processing system 202), or another suitable indicator.

The network connection 212 is a separate network from the network connection 211. In examples of the present disclosure, it is contemplated that the network connection 212 has a shorter range than the network connection 212, although this is not required. For example, the network connection 212 is a wireless network connection suitable for transmitting and receiving messages and data. Examples of suitable wireless network connections can include Wi-Fi network connections, Bluetooth network connections, near-field communication (NFC) network connections, infrared (IR) network connections, and the like.

By transmitting the message indicator, the message, and/or the data over the network connection 212, the functioning of the processing system 202 can be improved. For example, the processing system 202 can download the data associated with the message sent to the collaboration group using the network connection 212 instead of establishing a network connection directly with the communication server 220. If the processing systems 201-203 would otherwise connect directly to and receive messages and data from the communication server 220, the processing systems 201-203 may use cellular network connections, which can be slower than other network connections and which can cause the user of the processing system 202 to incur costs (i.e., paying for data usage over the cellular network). To solve these problems, the present techniques enable the processing system 202 to download a message and data directly from the processing system 201 when the processing system 202 is in proximity to the processing system 201. This may be beneficial to the processing system 202 if the processing system 202 is unable to connect to the communication server 220 (e.g., the processing system 202 is not equipped with the ability to connect to the communication server 220, is out of range of the communication server 220, etc.).

Moreover, by sending a message indicator to the processing system 202 when the message is received at the processing system 201, a user of the processing system 202 can decide whether he wants to download the data associated with the message sent to the collaboration group. If he chooses not to download the data (e.g., if the user decides he is uninterested in the content of the message and/or data), the processing system 202 saves storage space and processing space by not downloading the data.

The processing system 203 is not in the proximity 210 to the processing system 201 and therefore does not receive the message indicator from the first processing system. In the example of FIG. 2, the processing 203 can receive the message and/or download the data associated with the message from the communication server 220, for example. If the processing system 203 moves in the proximity 210 to the first processing system 201, the processing system 203 can receive the message indicator from the processing system 201.

FIG. 3 depicts a processing system 300 for data sharing among processing systems (e.g., the processing systems 201-203) in a collaboration group, according to aspects of the present disclosure. The processing system 300 includes a processing device 302, a memory 304, a data engine 310, and a proximity engine 312.

The various components, modules, engines, etc. described regarding FIG. 3 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 302 for executing those instructions. Thus a system memory (e.g., the memory 304) can store program instructions that when executed by the processing device 302 implement the engines described herein. Other engines can also be utilized to include other features and functionality described in other examples herein.

The data engine 310 receives the message sent to a collaboration group via a first network connection (e.g., the network connection 211) such as a cellular network connection when the processing system 300 is a member of the collaboration group and the message is sent to the collaboration group. The data engine 310 also downloads data such as an image, video, animation, etc., associated with the message via a first network connection (e.g., the network connection 211) such as from a communication server 220.

The proximity engine 312 determines whether any additional processing systems (that are members of the collaboration group) are in proximity (e.g., the proximity 210) to the processing system 300. The proximity engine 312 can determine whether any additional processing systems are in proximity to the processing 300 based on, for example, a range of the second network connection, a predetermined distance, etc. For example, if the second network connection is a Bluetooth connection, the proximity engine 312 determines that another processing system is in proximity to the processing system 300 based on the range of the Bluetooth connection. Moreover, determining whether another processing system is in proximity can be based on detecting the other possessing system by connecting to the other processing system using the second network connection. If the second network connection is successfully established, the two processing systems are said to be in proximity to one another. The proximity can also be a predefined distance (e.g., 20 feet, 35 feet, etc.) such that, if the processing systems are within the predefined distance, then the processing systems are said to be in proximity to one another.

When it is determined that another processing system (e.g., the processing system 202) is in proximity to the processing system 300, the data engine 310 sends a message indicator from the processing system 300 to the other processing system using a second network connection (e.g., the network connection 212) such as a Bluetooth connection, an NFC connection, etc.

Figure 4:
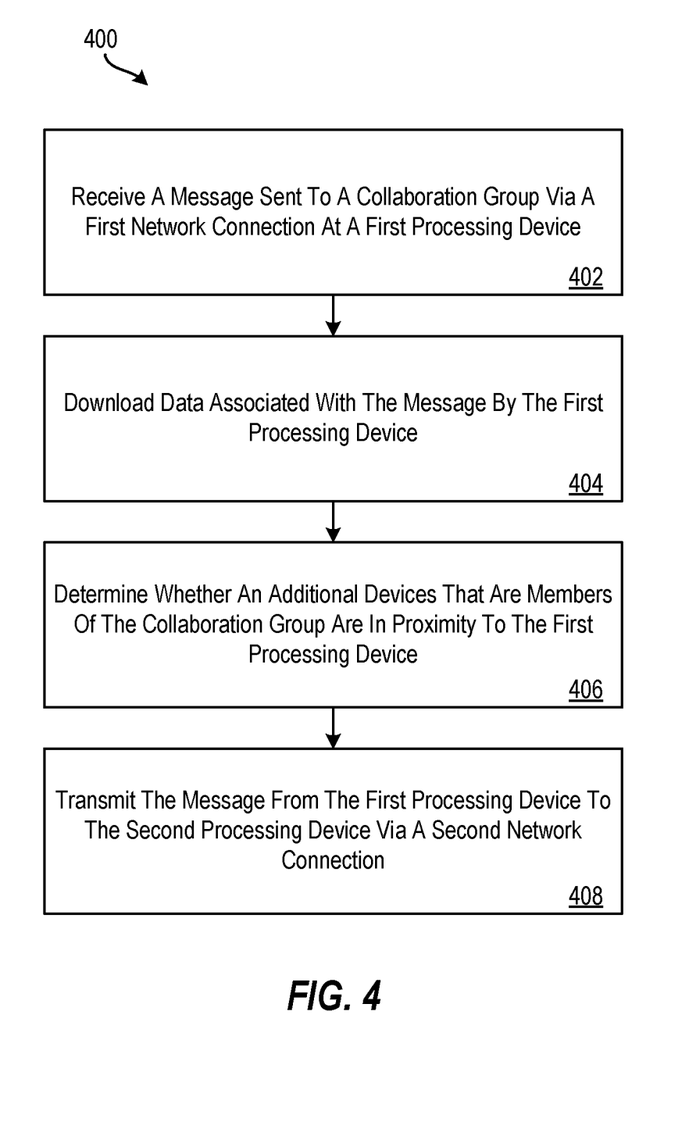
FIG. 4 depicts a flow diagram of a method for data sharing among processing systems in a collaboration group, according to aspects of the present disclosure.

FIG. 4 depicts a flow diagram of a method 400 for data sharing among processing systems (e.g., the processing systems 201-203) in a collaboration group, according to aspects of the present disclosure. The method 400 can be implemented using a processing system and/or a processing device, such as the processing system 100 of FIG. 1, the processing systems 201-203, the processing system 300, or another suitable processing system and/or processing device.

At block 402, a first processing system receives a message sent to a collaboration group via a first network connection, and the first processing system is a member of the collaboration group. For example, a collaboration group can include the processing systems 201-203, and the processing system 201 can receive a message sent to the collaboration group via the network connection 211. The message can be sent by another processing device or system such as the communication server 220. It should be appreciated that the communication server 220 can relay messages from other devices, such as one or more of the processing systems 201-203.

At block 404, the first processing system downloads data associated with the message. For example, the processing system 201 downloads the data associated with the message. The data can be text, an image, a video, an animation, audio, and the like.

At block 406, the first processing system detects whether any additional processing systems that are members of the collaboration group are in proximity to the first processing system. For example, the processing system 201 detects whether any of the additional processing systems 202, 203 that are members of the collaboration group are in proximity to the processing system 201.

At block 408, when it is determined that a second processing system that is a member of the collaboration group is in proximity to the first processing system, the first processing system transmits a message indicator from the first processing system to the second processing system via a second network connection. For example, when it is determined that the processing system 202 is in proximity 210 to the processing system 201, the processing system 201 transmits a message indicator (e.g., a hyperlink to the message and the data, a hyperlink to initiate a screen sharing session, etc.) from the processing system 201 to the processing system 202 via the network connection 212. The proximity 210 can be based on the range of the network connection 212, for example, or can be based on a predefined distance. According to aspects of the present disclosure, the second network connection is a wireless network connection, and determining whether any additional devices are in proximity to the first processing system is based at least in part on a range of the second network connection.

Additional processes also may be included. For example, the method 400 can include downloading, by the second processing device, the data associated with the message sent to the collaboration group from the first processing device via the second network connection. It should be understood that the processes depicted in FIG. 4 represent illustrations and that other processes may be added or existing processes may be removed, modified, or rearranged without departing from the scope and spirit of the present disclosure.

Figure 5:
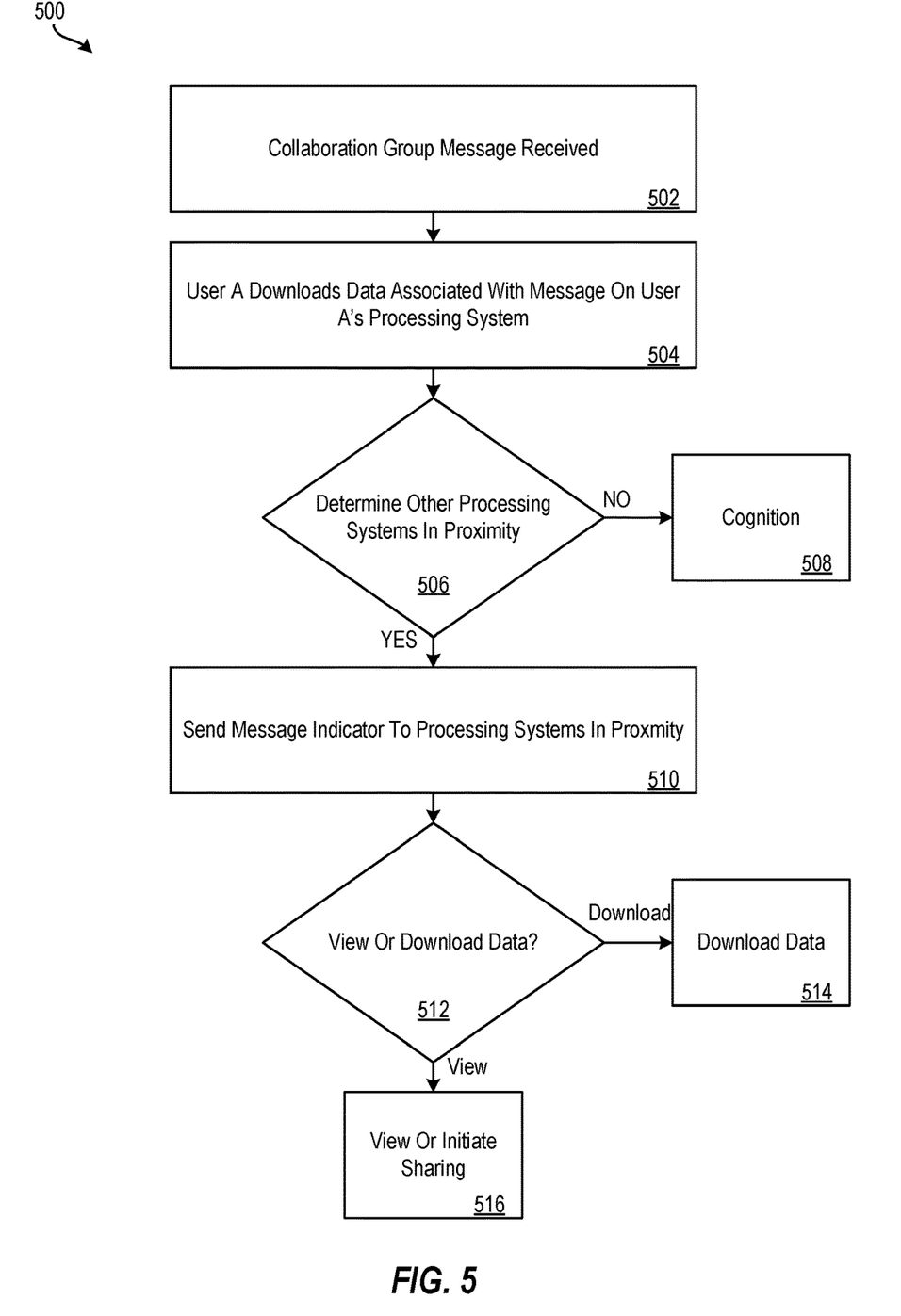
FIG. 5 depicts a flow diagram of a method for data sharing among processing systems in a collaboration group, according to aspects of the present disclosure.

FIG. 5 depicts a flow diagram of a method 500 for data sharing among processing systems (e.g., processing systems 201-203) in a collaboration group, according to aspects of the present disclosure. The method 500 can be implemented using a processing system and/or a processing device, such as the processing system 100 of FIG. 1, the processing systems 201-203, the processing system 300, or another suitable processing system and/or processing device.

At block 502, User A's processing system (e.g., the processing system 201, the processing system 300, etc.) receives a group collaboration message. At block 504, User A's processing system downloads data associated with the message. At decision block 506, User A's processing system determines whether other processing systems are in proximity (e.g., the proximity 210) to User A's processing system. If so, a message indicator is sent to the processing systems (e.g., the processing system 202) in proximity at block 510. At decision block 512, a user of each of the processing systems in proximity to User A's processing system are presented with an option to either view or download (or both) the data. If the user chooses to download the data at decision block 512, the data can be downloaded on the user's processing system at block 514 using a network connection between the user's processing system and User A's processing system. If the user chooses to view the data at decision block 512, the user can view a temporary copy of the data, can initiate screen sharing with User A's processing system, etc. at block 516. The method 500 can repeat for additional collaboration group messages.

At decision block 506, if a processing system is not determined to be in proximity to User A's processing system, cognition 508 can occur. Cognition 508 generally includes anticipating future proximity of a processing system so that data associated with the collaboration group message can be transferred between processing systems using the techniques described herein. For example, if the processing system 203 is within proximity 210, cognition 508 can determine that the processing system 203 is expected to be within the proximity 210 at a later time (e.g., based on a user's schedule, a user's habits, etc.). In such cases, cognition 508 can send the message indicator from the processing system 201 to the processing system 203 via the first network 211 instead of the second network 212. This reduces the amount of data the processing system 203 consumes since only the message indicator is sent to the processing system 203 and not the entire message and data associated therewith. The message indictor can include, for example, a thumbnail of an image, a link to enable the processing system 203 to download the message and the associated data, a message indicating that data will be downloaded later, etc. When the processing system 203 is later within the proximity 210, the processing system 203 can receive the message and/or the data associated with the message directly from the processing system 201 (or the processing system 202) using a second network connection between the processing system 201 (or the processing system 202) and the processing system 203, such as the network connection 212. This saves data, storage, and processing resources on the processing system 203.

Additional processes also may be included, and it should be understood that the processes depicted in FIG. 5 represent illustrations, and that other processes may be added or existing processes may be removed, modified, or rearranged without departing from the scope and spirit of the present disclosure.

A number of example scenarios exist in which the present techniques can prove useful. Although these scenarios are provided as examples, the present techniques are not so limited and these scenarios are provided merely as examples.

In one example scenario, consider a collaboration group with 10 members. At certain times, some members work remotely while other members work in the office. A message with data (e.g., an image, a video, etc.) is sent to the entire collaboration group. One of the users who is in office downloads the data and the other users in office receives a message indicator with an option to choose whether each of the other users in the offices wants to view the data temporarily, download the data to the user's processing system, ignore the data, and the like. If the user selects the temporary view option, the user is able to screen share with the user who downloaded the data. In another example, if the user selects the temporary view option, the user's processing system temporarily downloads the data and automatically deletes it once the user has opened and reviewed it. In this example, the transfer of the message indicator and the data between the users in the office is performed using Bluetooth connections or another suitable connection to facilitate data transfer between two devices without using Internet connections (after the data is downloaded by one of the users' processing systems. This saves time, bandwidth, and other processing and storage resources.

Another example scenario capitalizes on the existing proximity cognition during the day thereby reserving the download of data until the users processing systems actually are in proximity. For example, in a family, the husband is out for work in the morning, and the wife is at home when another relative shares some family pictures to a family (collaboration) group. While the download is happening with cognitive capabilities and daily user behavior, the present techniques understand that (1) the husband is on mobile data which could be costlier; and (2) the husband is expected to return home in the evening and therefore internet bandwidth may not need to be utilized to download the pictures. Instead, for the husband, there are thumbnail images/or links (i.e., message indicators) displayed on his device. On the other hand, since the wife is (presumably) connected to a home network, her processing system can download the images much faster without using mobile data. Therefore, when the husband is back home in the evening the wife's processing system detects the husband's device as being in proximity and automatically transfers the images or (depending on the user's settings) prompts the husband to download the images.

Similarly, one colleague (User1) is out to lunch, and another colleague (User2) is in the office and downloads the data. The present techniques can be used to determine that User1 is expected to be in office soon as per his usual routine; therefore, instead of downloading the data at User1's processing system (such as over a mobile data connection), User1's processing system is instead provided with a link and/or thumbnails on his processing system. When User1 returns from lunch, User1's processing system can download the data from User2's processing system when it is in proximity to User2's processing system.

In yet another scenario, if all the members of the collaboration group are in the same location (e.g., in an office conference room), User1's processing systems can download data associated with a group message, and the other members of the group are provided a message indicator from the processing system that downloaded the data. User1 can select to share his screen with one or more of the other user's processing systems, and thus the data is shared among group. During the screen share, any user that wishes to download the data can do so his respective processing system while screen sharing is active.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a first processing system, a message sent to a collaboration group via a first network connection, wherein the first processing system is a member of the collaboration group;
   downloading, by the first processing system, data associated with the message via the first network connection;
   determining, by the first processing system, whether any additional processing systems that are members of the collaboration group are in proximity to the first processing system; and
   based at least in part on determining that a second processing system that is a member of the collaboration group is in proximity to the first processing system, transmitting, by the first processing system, a message indicator from the first processing system to the second processing system via a second network connection; and
   based at least in part on determining that a third processing system that is a member of the collaboration group is not in proximity to the first processing system, performing a cognition analysis to determine a future proximity of the third processing system when the third processing system is anticipated to be in proximity to the first processing system, and transmitting a message indicator or data associated with the message directly from the first processing system to the third processing system via a third network connection between the first processing system and the third processing system responsive to the future proximity occurring.

2. The computer-implemented method of claim 1, further comprising downloading, by the second processing system, the data associated with the message sent to the collaboration group from the first processing system via the second network connection.

3. The computer-implemented method of claim 1, wherein the second network connection is a wireless network connection, and wherein determining whether any additional devices are in proximity to the first processing system is based at least in part on a range of the second network connection.

4. The computer-implemented method of claim 1, wherein the message indicator comprises a hyperlink to the message and the data.

5. The computer-implemented method of claim 1, wherein the message indicator comprises a hyperlink to initiate a screen sharing session from the first processing system on the second processing system.

6. The computer-implemented method of claim 5, further comprising initiating the screen sharing session based at least in part on receiving an indication from a user of the second processing system to imitate the screen sharing session.

\* \* \* \* \*